United States Patent
Hung et al.

(10) Patent No.: US 9,014,474 B2
(45) Date of Patent: Apr. 21, 2015

(54) SYSTEMS AND METHODS FOR MULTI-RESOLUTION INPAINTING

(71) Applicant: Cyberlink Corp., Shindian, Taipei (TW)

(72) Inventors: Hao-Ping Hung, New Taipei (TW); Ho-Chao Huang, New Taipei (TW)

(73) Assignee: Cyberlink Corp., Shindian, Taipei (TW)

( * ) Notice: Subject to any disclaimer, the term of this patent is extended or adjusted under 35 U.S.C. 154(b) by 29 days.

(21) Appl. No.: 14/019,581

(22) Filed: Sep. 6, 2013

(65) Prior Publication Data

US 2014/0064614 A1 Mar. 6, 2014

Related U.S. Application Data

(60) Provisional application No. 61/697,595, filed on Sep. 6, 2012, provisional application No. 61/705,390, filed on Sep. 25, 2012.

(51) Int. Cl.
*G06K 9/00* (2006.01)
*G06T 3/40* (2006.01)

(52) U.S. Cl.
CPC .................... *G06T 3/4092* (2013.01)

(58) Field of Classification Search
None
See application file for complete search history.

(56) References Cited

U.S. PATENT DOCUMENTS

| 5,461,655 | A | 10/1995 | Vuylsteke et al. | |
|---|---|---|---|---|
| 8,073,277 | B2* | 12/2011 | Huan et al. | 382/254 |
| 8,385,681 | B2* | 2/2013 | Weiss | 382/275 |
| 2007/0047828 | A1* | 3/2007 | Ishii et al. | 382/232 |
| 2009/0034868 | A1* | 2/2009 | Rempel et al. | 382/264 |
| 2009/0116722 | A1* | 5/2009 | Chen et al. | 382/132 |
| 2010/0239187 | A1* | 9/2010 | Yea et al. | 382/298 |

OTHER PUBLICATIONS

Yamauchi et al. ("Image restoration using multiresolution texture synthesis and image inpainting," Proceedings of the Computer Graphics International, 2003, pp. 120-125).*

Miaohui Wang; Bo Yan; Gharavi, H. "Pyramid model based Down-sampling for image inpainting", Image Processing (ICIP), 2010 17th IEEE International Conference on, on pp. 429-432.*

Lili Wang; Yi Wan, "Multiresolution image inpainting," Computer Science and Automation Engineering (CSAE), 2012 IEEE International Conference on , vol. 3, No., pp. 22,26, May 25-27, 2012.*

Shih et al, Multi-resolution image inpainting, ICME '03 Proceedings of the 2003 International Conference on Multimedia and Expo—vol. 2, pp. 485-488.*

(Continued)

*Primary Examiner* — Andrae S Allison
(74) *Attorney, Agent, or Firm* — McClure, Qualey & Rodack, LLP

(57) ABSTRACT

Various embodiments are disclosed for performing inpainting. One embodiment is a method for editing a digital image in an image editing device. The method comprises obtaining an inpainting region in the digital image, determining a target resolution for scaling a resolution of the digital image based on an original resolution of the digital image, and determining an intermediate resolution level for scaling a resolution of the digital image based on the target resolution. The method further comprises scaling the resolution of the digital image to the intermediate resolution level, performing partial inpainting of the inpainting region at the intermediate resolution, and performing inpainting on a remainder portion in the inpainting region at a final target resolution.

26 Claims, 12 Drawing Sheets

(56) References Cited

OTHER PUBLICATIONS

J.M. Ogden et al. "Pyramid-Based Computer Graphics," RCA Engineer, 30-5, Oct. 1985.

Melvyn Carroll, "Image Background Interpolation in Nuclear Medicine Using Wavelet Based Inpainting" J Nucl Med. 2008; 49 (Supplement 1), 396P.

Shih et al. "Multi-Resolution Image Inpainting" Proceedings of the IEEE International Conference on Multimedia and Expo (ICME 2003).

Rong-Chi Chang and Timothy K Shih, "Multilayer Inpainting on Digitalized Artworks" Journal of Information Science and Engineering 24, 1241-1255 (2008).

Sun et al. "Image Completion with Structure Propagation" ACM Transactions on Graphics, 2005.

* cited by examiner

SYSTEMS AND METHODS FOR MULTI-RESOLUTION INPAINTING

CROSS-REFERENCE TO RELATED APPLICATION

This application claims priority to, and the benefit of, U.S. Provisional Patent Application entitled "Systems and Methods for Multi-Resolution Inpainting," having Ser. No. 61/697,595, filed on Sep. 6, 2012 and U.S. Provisional Patent Application entitled "Systems and Methods for Multi-Resolution Inpainting," having Ser. No. 61/705,390, filed on Sep. 25, 2012, both of which are incorporated herein by reference in their entireties.

TECHNICAL FIELD

The present disclosure generally relates to video processing, and more particularly, to systems and methods for performing multi-resolution inpainting.

BACKGROUND

Over the years, digital content has gained increasing popularity with consumers. With the ever-growing amount of digital content available to consumers through the Internet using computers, smart phones, and other sources, consumers have access to a vast amount of content. Furthermore, many devices (e.g., smartphones) and services are readily available that allow consumers to capture and generate digital content.

The process of inpainting involves reconstructing lost or deteriorated parts of images and videos. Specifically, restoration algorithms are applied to replace portions of an image. A user, for example, may wish to remove one or more regions within an image containing objects or defects. Some inpainting techniques involve filling in the restoration region in the image by searching for similar patches in a nearby source region of the image and then copying the pixels from the most similar patch into the restoration region.

SUMMARY

Briefly described, one embodiment, among others, is a method for editing a digital image in an image editing device. The method comprises obtaining an inpainting region in the digital image, determining a target resolution for scaling a resolution of the digital image based on an original resolution of the digital image, and determining an intermediate resolution level for scaling a resolution of the digital image based on the target resolution. The method further comprises scaling the resolution of the digital image to the intermediate resolution level, performing partial inpainting of the inpainting region at the intermediate resolution, and performing inpainting on a remainder portion in the inpainting region at a final target resolution.

Another embodiment is a method for editing a digital image in an image editing device that comprises obtaining an inpainting region in the digital image, determining a target resolution for scaling a resolution of the digital image based on an original resolution of the digital image, and determining an intermediate resolution level for scaling a resolution of the digital image based on the target resolution. The method further comprises scaling the resolution of the digital image to the intermediate resolution level, determining whether to perform partial inpainting of the inpainting region at the intermediate resolution level, and based on the determination of whether to perform partial inpainting, performing partial inpainting at the intermediate resolution level. The method further comprises performing inpainting on a remainder portion in the inpainting region at a final target resolution.

Another embodiment is a system for editing a digital image in an image editing device. The system comprises a processor, a media interface, executable in the processor, configured to obtain an inpainting region in the digital image, and a resolution adjuster, executable in the processor, configured to determine a target resolution for scaling a resolution of the digital image based on an original resolution of the digital image, wherein the resolution adjuster is further configured to determine at least one intermediate resolution level for scaling a resolution of the digital image based on the target resolution. The system further comprises an inpainting component, executable in the processor, configured to determine whether to perform inpainting of the inpainting region and perform inpainting of the inpainting region based on the determination. For an intermediate resolution level, the resolution adjuster is configured to scale the resolution of the digital image to the intermediate level and the inpainting component is configured to perform partial inpainting of the inpainting region at the intermediate resolution. The inpainting component is further configured to perform inpainting on a remainder portion in the inpainting region at the target resolution.

Another embodiment is a non-transitory computer-readable medium embodying a program executable in a computing device that comprises code that obtains an inpainting region in the digital image, code that determines a target resolution for scaling a resolution of the digital image based on an original resolution of the digital image, and code that determines at least one intermediate resolution level for scaling a resolution of the digital image based on the target resolution. The program further comprises code that scales, for an intermediate resolution level, the resolution of the digital image to the intermediate level, code that determines whether to perform partial inpainting of the inpainting region at the intermediate resolution level, code that performs partial inpainting at the intermediate resolution level based on the determination of whether to perform partial inpainting, and code that performs inpainting on a remainder portion in the inpainting region at the target resolution.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

The process of inpainting involves reconstructing lost or deteriorated parts of images and videos. Specifically, restoration algorithms are applied to replace lost or corrupted portions of an image. Patch matching is a commonly used technique for inpainting. This technique works well in cases where the image exhibits regular texture and where the missing information resulting from removal of an object in the image can be reconstructed using suitable patches from information associated with areas in the image that is known (i.e., those areas outside the area to be restored).

However, many images comprise unique non-repetitive structures, and structure information associated with an image is typically not considered during the restoration process, thereby resulting in artifacts. Furthermore, many inpainting techniques implement a single-downscaling approach whereby interpolation or extrapolation of neighboring pixels is performed after downscaling the image from an original resolution level to a lower resolution.

Downscaling is performed, in part to reduce the computational requirements for the inpainting operation by facilitating the extraction of edge information and the identification of exemplars for patch matching purposes. Furthermore, with the use of downscaling, the visual quality of the edited image may be improved as the inpainting region more closely matches the structure and texture of the area surrounding the inpainting region.

Figure 1:
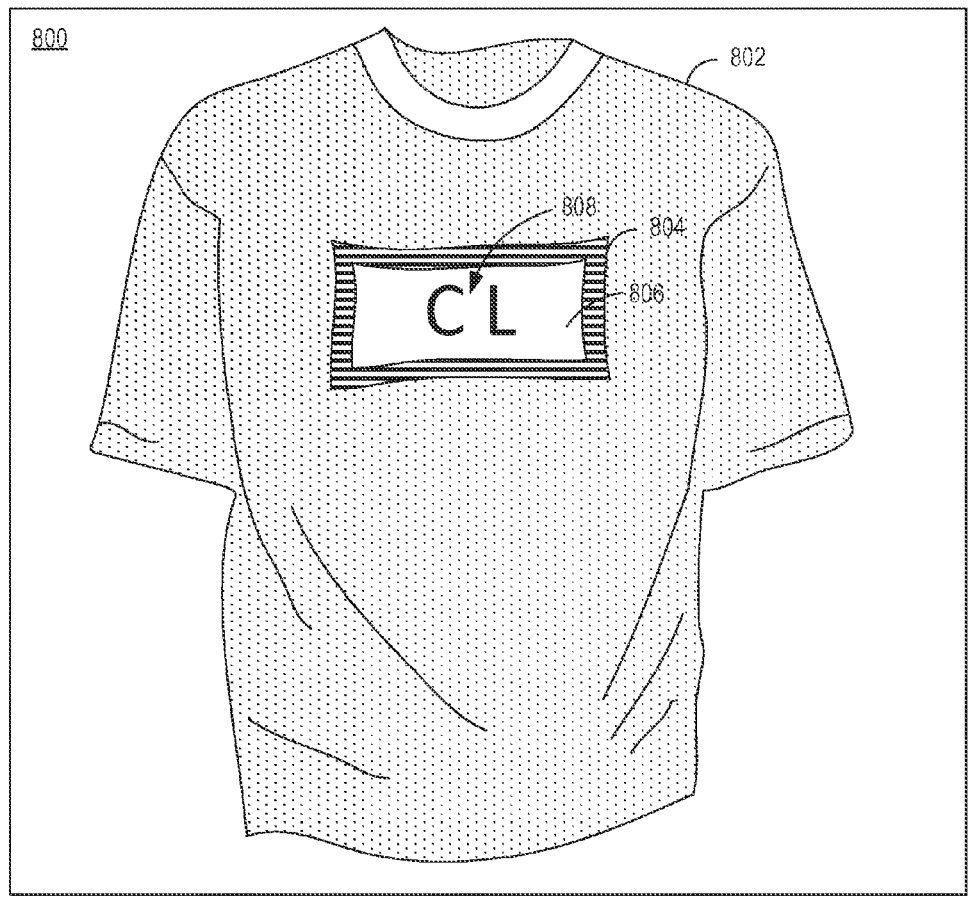
FIG. 1 is an example of an object within a digital image to be edited.

In some cases, however, reducing the resolution of an image may result in an area surrounding the inpainting region being significantly reduced where the surrounding area becomes too small for patch matching purposes. To further illustrate, reference is made to FIGS. 1-4, which illustrate one of the obstacles when performing inpainting based on a single downscaling operation. Shown in FIG. 1 is an example of an object 802 within an image 800 to be edited. The object 802 includes smaller objects 804, 806, 808 such as a t-shirt graphic. Assume, for purposes of illustration, that the user wishes to remove the "CL" letter object 808 from the t-shirt object 802.

Figure 2:
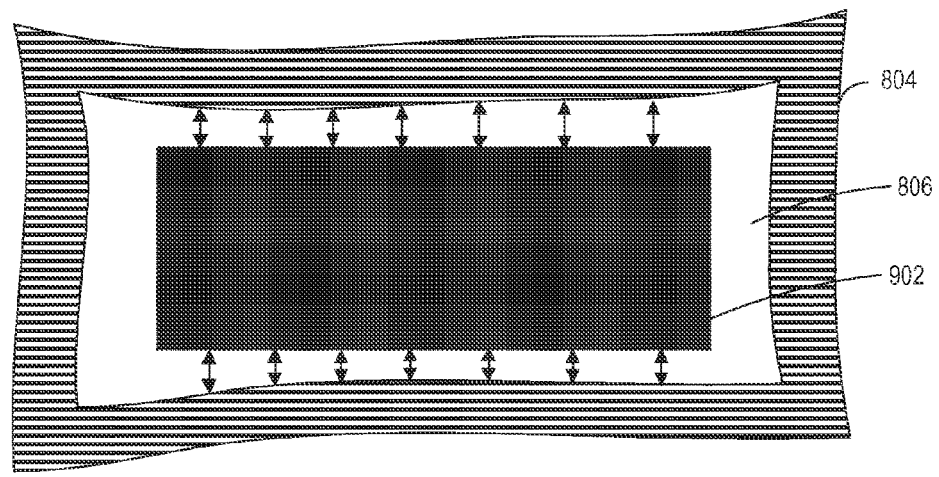
FIG. 2 illustrates an inpainting region in the digital image of FIG. 1, where the inpainting region encompasses the object to be removed.
Figure 3:
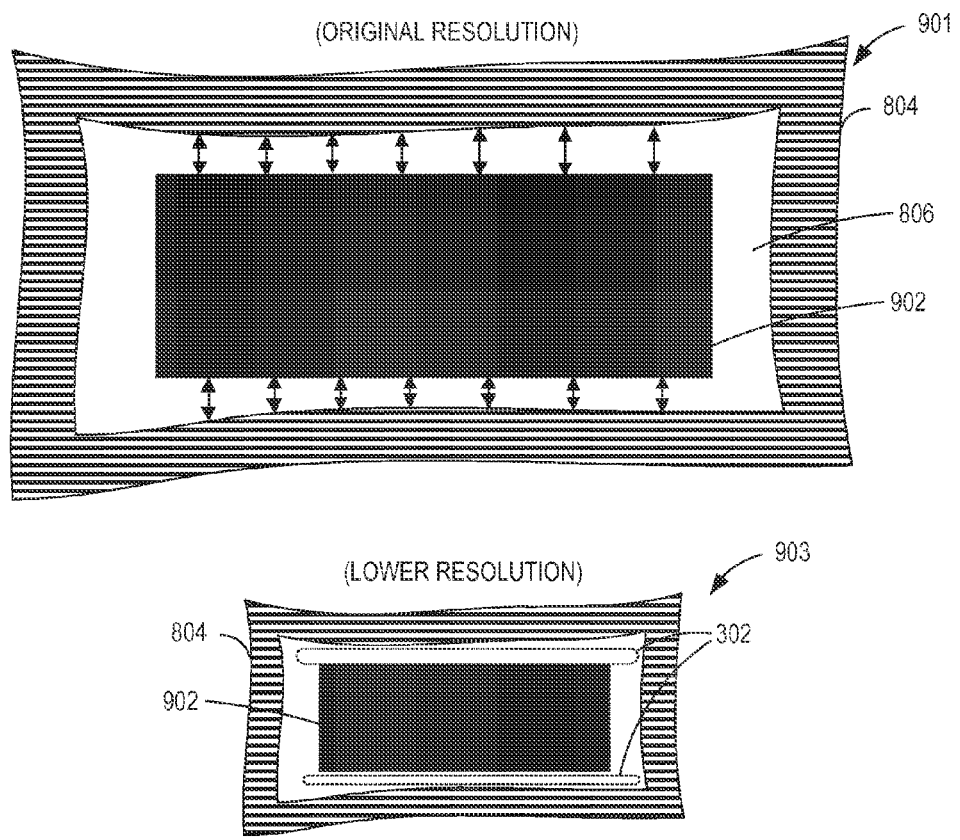
FIG. 3 illustrates the downscaling of the original resolution of the digital image in FIG. 1.

With reference to FIG. 2, the user specifies an inpainting region 902 that encompasses the object 808 (FIG. 1) to be removed. Note that in this instance, the inpainting region 902 is surrounded by two objects/regions 804, 806. FIG. 3 illustrates the downscaling of the original resolution of the image 800 in FIG. 1. Suppose, for example, that the image 800 has an original resolution 901 of (1,900×1,600), and suppose that this resolution is downscaled to a lower resolution of (380×320). The inpainting region 902 of the downscaled version of the image 903 is filled by analyzing the contents surrounding the inpainting region 902 in the downscaled version of the image 903. The inpainting region 902 of the image 800 at the original resolution 901 will then be filled according to the inpainting operation performed on the downscaled version of the image 903. Generally, the single-downscaling approach realizes various advantages. First, the integrity of the image is maintained while computational time in performing the inpainting operation is reduced.

However, in some scenarios, the single downscaling mechanism may result in artifacts being introduced into the image. With reference to FIG. 3, intuitively, the inpainting region 902 should be filled such that the region matches the surrounding region 806. However, as shown in FIG. 3, the surrounding region 806 shrinks due to the downscaling operation, as illustrated by the thin areas 302 highlighted in FIG. 3.

Figure 4:
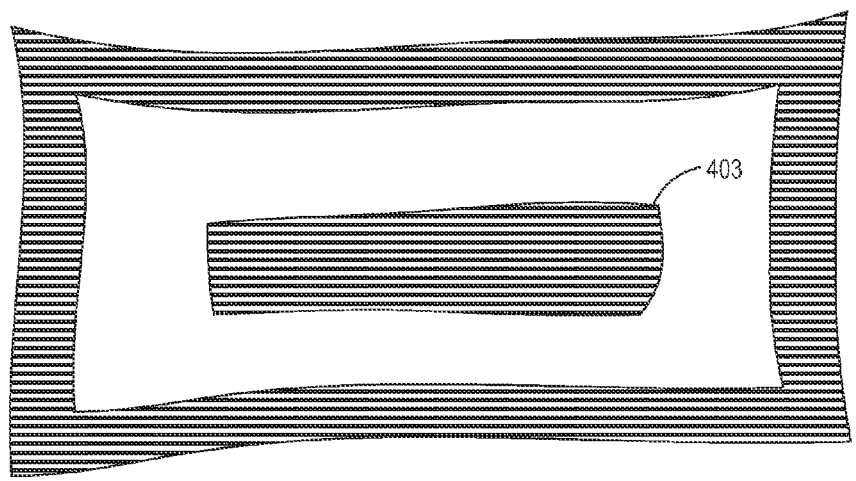
FIG. 4 illustrates the resulting artifacts that are introduced into the inpainting region of FIG. 3 as a result of patch matching beyond the region immediately surrounding the inpainting region.

FIG. 4 illustrates the resulting artifacts 403 that are introduced into the inpainting region 902 (FIG. 3) as a result of patch matching beyond the region 806 (FIG. 2) surrounding the inpainting region 902 (FIG. 2). Due to the thin surrounding region 806, patch matching may be based in part on the next surrounding region 804 (FIG. 2) where candidate pixels for inpainting purposes are identified in the outer region 804. As a result, rather than being filled based on the immediate surrounding region 806, the inpainting region 902 may be filled based on both the immediate surrounding region 806 and the next surrounding region 804.

Various embodiments are disclosed for performing a hierarchical inpainting technique whereby downscaling of an image at an original resolution to intermediate resolutions is performed. At each intermediate resolution, analysis of the surrounding region is performed and based on the analysis, partial inpainting of the inpainting region may be performed. Iterative downscaling is performed until the final, target resolution is reached. At the target resolution, the inpainting of any remaining portions of the inpainting region is completed. As described in more detail below, the analysis at each intermediate resolution comprises, for example, calculation of a dissimilarity value between characteristics of boundary pixels surrounding the restoration region with respect to characteristics of pixels surrounding the boundary, where the a distance threshold may be implemented for identifying surrounding pixels to sample.

Figure 9:
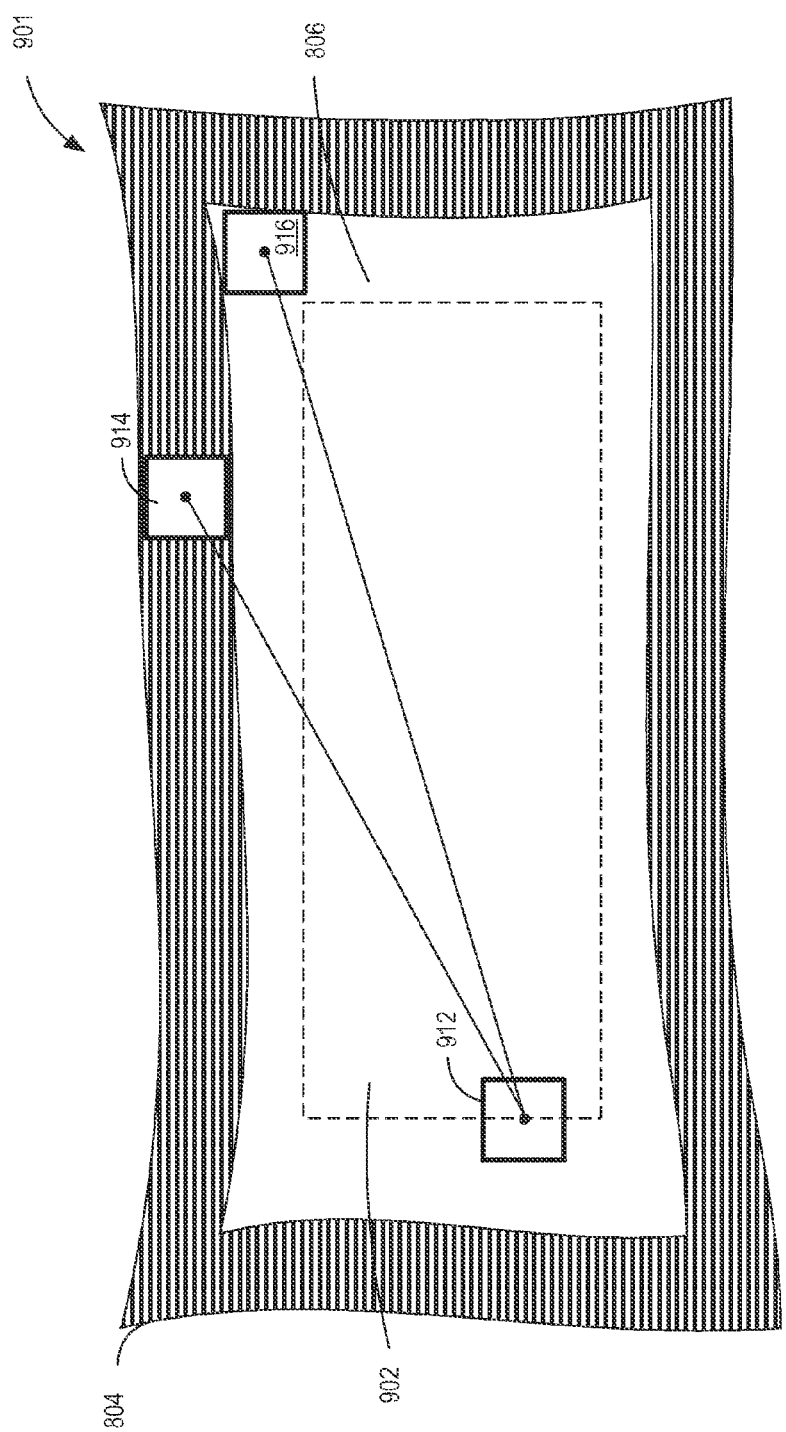
FIG. 9 illustrates one of the disadvantages of not performing inpainting operations at intermediate levels.

FIG. 9 illustrates one of the advantages of performing inpainting operations at intermediate levels. As discussed above, reducing the resolution of an image based on a single downscaling operation may result in an area surrounding the inpainting region being significantly reduced where the surrounding area becomes too small for patch matching. For a given boundary pixel, a suitable pixel is identified for inpainting purposes by performing patch matching. Patch matching involves identifying a suitable, matching pixel block by comparing the difference in color value of a pixel block 912 centered about a boundary pixel, as shown in FIG. 9.

As described above, when the image is downscaled to a final resolution level, the number of suitable, matching pixels may become limited due to the downscaling process. As shown, patch matching may result in identification of a pixel block 916 in the outer surrounding region 806 rather than of a pixel block 914 in the region 804 immediately surrounding the inpainting region 902.

Figure 5:
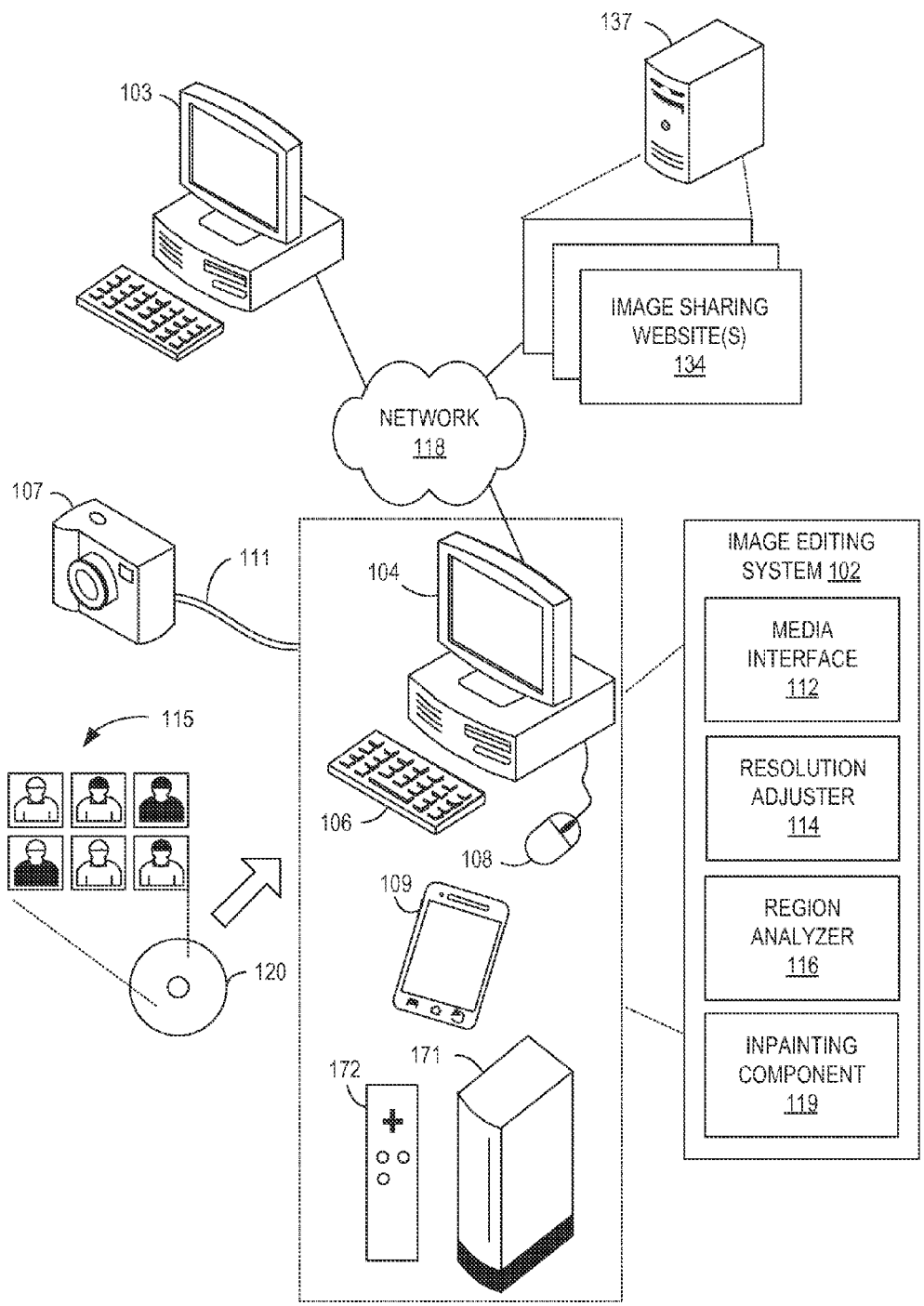
FIG. 5 is a block diagram of a video editing system for facilitating inpainting in accordance with various embodiments of the present disclosure.

A description of a system for performing the inpainting techniques disclosed is now described followed by a discussion of the operation of the components within the system. FIG. 5 is a block diagram of an image editing system 102 in which embodiments of the inpainting techniques disclosed herein may be implemented. The image editing system 102 may be embodied, for example, as a desktop computer, computer workstation, laptop, a smartphone 109, a tablet, or other computing platform that includes a display 104 and may include such input devices as a keyboard 106 and a mouse 108.

For embodiments where the image editing system 102 is embodied as a smartphone 109 or tablet, the user may interface with the image editing system 102 via a touchscreen interface (not shown). In other embodiments, the image editing system 102 may be embodied as a video gaming console 171, which includes a video game controller 172 for receiving user preferences. For such embodiments, the video gaming console 171 may be connected to a television (not shown) or other display 104.

The image editing system 102 is configured to retrieve, via the media interface 112, digital media content 115 stored on a storage medium 120 such as, by way of example and without limitation, a compact disc (CD) or a universal serial bus (USB) flash drive, wherein the digital media content 115 may then be stored locally on a hard drive of the image editing system 102. As one of ordinary skill will appreciate, the digital media content 115 may be encoded in any of a number of formats including, but not limited to, JPEG (Joint Photographic Experts Group) files, TIFF (Tagged Image File Format) files, PNG (Portable Network Graphics) files, GIF (Graphics Interchange Format) files, BMP (bitmap) files or any number of other digital formats.

The digital media content 115 may be encoded in other formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), Quick-Time (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), or any number of other digital formats.

As depicted in FIG. 5, the media interface 112 in the image editing system 102 may also be configured to retrieve digital media content 115 directly from a digital camera 107 where a cable 111 or some other interface may be used for coupling the digital camera 107 to the image editing system 102. The image editing system 102 may support any one of a number of common computer interfaces, such as, but not limited to IEEE-1394 High Performance Serial Bus (Firewire), USB, a serial connection, and a parallel connection.

The digital camera 107 may also be coupled to the image editing system 102 over a wireless connection or other communication path. The image editing system 102 may be coupled to a network 118 such as, for example, the Internet, intranets, extranets, wide area networks (WANs), local area networks (LANs), wired networks, wireless networks, or other suitable networks, etc., or any combination of two or more such networks. Through the network 118, the image editing system 102 may receive digital media content 115 from another computing system 103. Alternatively, the image editing system 102 may access one or more image sharing websites 134 hosted on a server 137 via the network 118 to retrieve digital media content 115.

The resolution adjuster 114 in the image editing system 102 is configured to downscale or upscale the resolution of the media content 115 obtained by the media interface 112 for purposes of performing inpainting operations. For some embodiments, the resolution adjuster 114 adjusts the resolution of the media content 115 to intermediate resolutions before downscaling to a final target resolution. Upon completion of the inpainting operation at the lowest, target resolution, the resolution adjuster 114 upscales the resolution of the media content 115 back to the original resolution with the inpainting region filled.

At the current resolution set by the resolution adjuster 114, the region analyzer 116 is configured to analyze the characteristics of the inpainting region 902 (FIG. 2) as well as regions surrounding the inpainting region 902 and determine whether sufficient samples are available at the current resolution for inpainting purposes. For example, the region analyzer 116 may determine that for a given downscaled resolution set by the resolution adjuster 114, one or more regions proximate to the inpainting region 902 may be utilized for inpainting based on closely matching color values or other characteristics. The pixel values corresponding to the one or more regions are generated and the restoration region is filled based on the generated pixels.

The resolution adjuster 114 then downscales the image to the next, intermediate resolution level. Again, the region analyzer 116 identifies one or more candidate regions and generates corresponding pixel values for inpainting. This process is continued until the final, target resolution is reached. At the final resolution level, any remaining portion of the inpainting region 902 is filled.

The inpainting component 119 is configured to perform the inpainting operations described above at the various resolution levels, including the intermediate resolution levels. Note that at each resolution level, a portion of the inpainting region 902 is filled, thereby providing the next (lower) resolution level with more candidate regions to select from for purposes of filling in the inpainting region 902. As such, a hierarchical inpainting technique is implemented whereby inpainting is performed at intermediate resolutions to generate better quality images with fewer artifacts while utilizing fewer computational resources.

Figure 6:
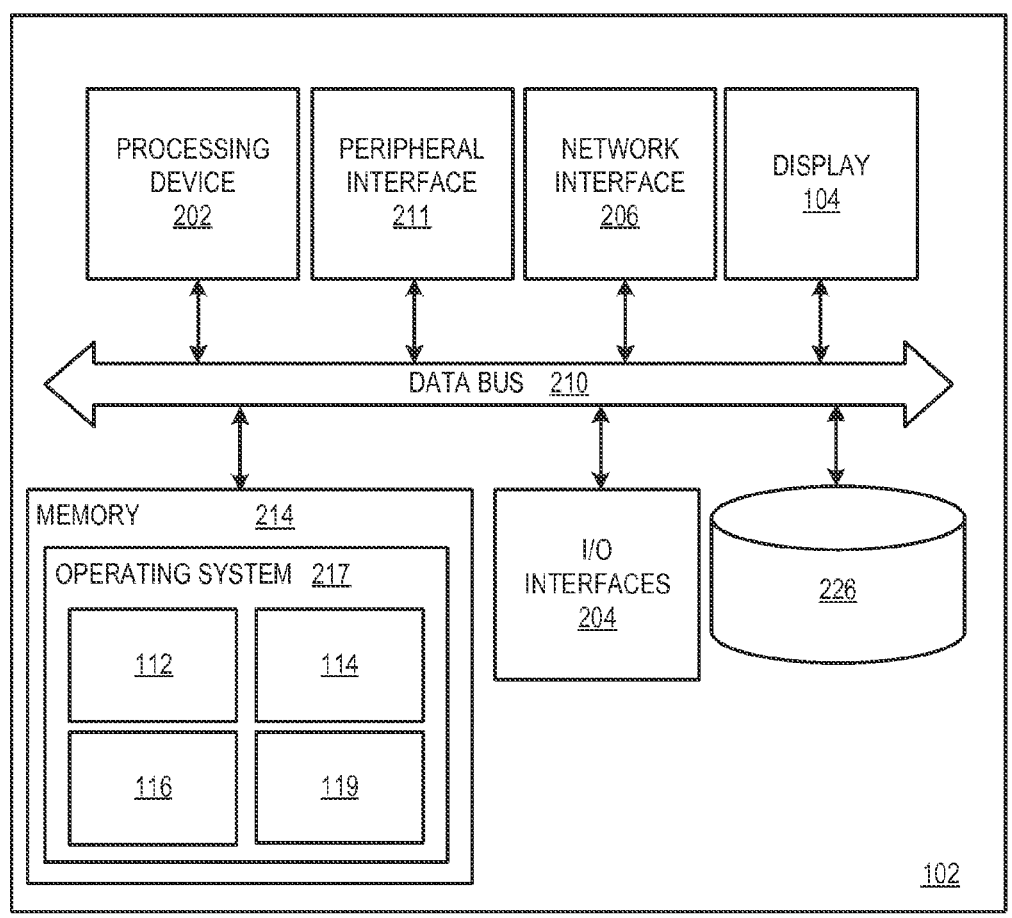
FIG. 6 is a detailed view of the video editing system device of FIG. 5 in accordance with various embodiments of the present disclosure.

FIG. 6 is a schematic diagram of the image editing system 102 shown in FIG. 5. The image editing system 102 may be embodied in any one of a wide variety of wired and/or wireless computing devices, such as a desktop computer, portable computer, dedicated server computer, multiprocessor computing device, smartphone 109 (FIG. 5), tablet computing device, and so forth. As shown in FIG. 6, the image editing system 102 comprises memory 214, a processing device 202, a number of input/output interfaces 204, a network interface 206, a display 104, a peripheral interface 211, and mass storage 226, wherein each of these devices are connected across a local data bus 210.

The processing device 202 may include any custom made or commercially available processor, a central processing unit (CPU) or an auxiliary processor among several processors associated with the image editing system 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 217, one or more native applications, emulation systems, or emulated applications for any of a variety of operating systems and/or emulated hardware platforms, emulated operating systems, etc.

The applications may include application specific software which may comprise some or all the components (media interface 112, resolution adjuster 114, region analyzer 116, inpainting component 119) of the image editing system 102 depicted in FIG. 5. In accordance with such embodiments, the components are stored in memory 214 and executed by the processing device 202. One of ordinary skill in the art will appreciate that the memory 214 can, and typically will, comprise other components which have been omitted for purposes of brevity.

Input/output interfaces 204 provide any number of interfaces for the input and output of data. For example, where the image editing system 102 comprises a personal computer, these components may interface with one or more user input devices via the I/O interfaces 204, where the user input devices may comprise a keyboard 106 (FIG. 5) or a mouse 108 (FIG. 5). The display 104 may comprise a computer monitor, a plasma screen for a PC, a liquid crystal display (LCD), a touchscreen display, or other display device 104.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

With further reference to FIG. 6, network interface 206 comprises various components used to transmit and/or receive data over a network environment. For example, the network interface 206 may include a device that can communicate with both inputs and outputs, for instance, a modulator/demodulator (e.g., a modem), wireless (e.g., radio frequency (RF)) transceiver, a telephonic interface, a bridge, a router, network card, etc.). The image editing system 102 may communicate with one or more computing devices via the network interface 206 over the network 118 (FIG. 5). The image editing system 102 may further comprise mass storage 226. The peripheral interface 211 supports various interfaces including, but not limited to IEEE-1294 High Performance Serial Bus (Firewire), USB, a serial connection, and a parallel connection.

Figure 7:
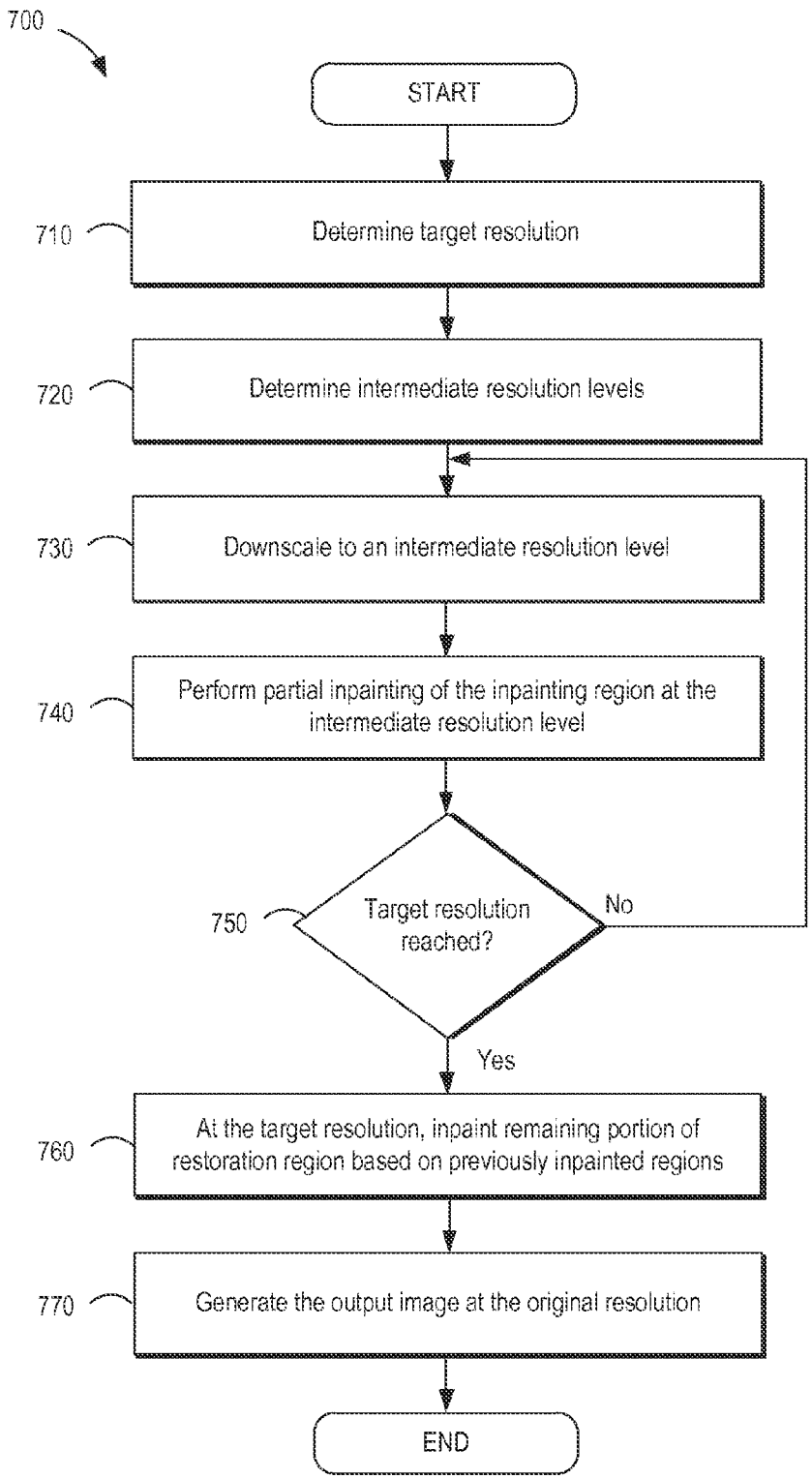
FIG. 7 is a top-level flowchart illustrating examples of functionality implemented as portions of the video editing system of FIG. 5 for facilitating inpainting according to various embodiments of the present disclosure.

Reference is made to FIG. 7, which is a flowchart 700 in accordance with one embodiment for facilitating inpainting performed by the image editing system 102 of FIG. 5. It is understood that the flowchart 700 of FIG. 7 provides merely an example of the many different types of functional arrangements that may be employed to implement the operation of the various components of the image editing system 102 (FIG. 5). As an alternative, the flowchart of FIG. 7 may be viewed as depicting an example of steps of a method implemented in the image editing system 102 according to one or more embodiments.

Although the flowchart of FIG. 7 shows a specific order of execution, it is understood that the order of execution may differ from that which is depicted. For example, the order of execution of two or more blocks may be scrambled relative to the order shown. Also, two or more blocks shown in succession in FIG. 7 may be executed concurrently or with partial concurrence. It is understood that all such variations are within the scope of the present disclosure.

Beginning with block 710, a final, target resolution is determined where the target resolution is less than the original resolution of the source image. In accordance with some embodiments, the final resolution comprises a downscaled version of the image at the original resolution and may be calculated according to the following expression for the final downscale ratio (rf):

$$rf = \min(32/d, 1).$$

In the expression above, the parameter (d) represents the thickness of the inpainting region measured in pixels. The final downscale resolution (Rf) may then be calculated according to Rf=(original resolution)*(rf).

In block 720, intermediate resolution levels are calculated according to the following expression for the intermediate resolution ratio (ri):

$$ri = 1/2^i, i = 1, 2, 3, \ldots \text{ (where } ri \text{ is greater than } rf\text{)}.$$

The intermediate resolution (Ri) may then be calculated according to Ri=(original resolution)*ri.

In block 730, the image is downscaled from the original resolution level to the first intermediate resolution level as calculated above. In block 740, partial inpainting of the inpainting region is performed at the intermediate resolution level. For some embodiments, pixels surrounding the inpainting region are sampled and candidate pixels for performing partial inpainting of the restoration region are identified based on a dissimilarity factor. This may comprise sampling pixels located a predetermined distance beyond the boundary of the inpainting region and determining the dissimilarity value with respect to pixels located on the boundary, as described in more detail below. Based on the dissimilarity value, partial inpainting of the inpainting region is performed. In accordance with some embodiments, a predetermined amount of inpainting is performed at each intermediate resolution.

At decision block 750, a determination is made on whether the current downscale resolution is equal to the final, target resolution. If the target resolution has not been reached, then operation returns back to block 730, where downscaling is performed. If the target resolution has been reached, then in block 760, the remaining portion(s) of the inpainting region is filled and a final image is generated with the inpainting region filled. For some embodiments, the inpainting process at the final resolution level comprises the following steps below.

First, for each pixel close to the boundary in the selected inpainting area, the corresponding motion vector is calculated using level 2 (L2) sum of absolute distance (SAD) metrics utilizing a random search mechanism. For each pixel, if the L2 SAD value is less than a predetermined threshold, inpainting of the corresponding pixel value is performed according to the motion vector. The source image and the selected inpainting area are selected and the steps above are repeated until the inpainting region is filled.

Returning to the flowchart of FIG. 7, in block 770, an output image at the original resolution is then generated with the inpainting region filled. For some embodiments, upscaling of the inpainted digital image/selected inpainting area from the target resolution to the intermediate resolution(s) and then to the original resolution level is performed. The motion vectors described above calculated using L2 SAD metrics are also upscaled from the target resolution to the intermediate resolution(s) and then to the original resolution.

At each resolution level, the motion vectors for the partially inpainted pixels derived in block 740 are combined. The motion vectors are further refined using L2 SAD metrics with a random search mechanism, and the pixel values are updated according to the refined motion vectors. The steps above are repeated until the original resolution level is reached. In this regard, processing is performed in a reverse order relative to the downscaling operations described earlier.

Figure 8:
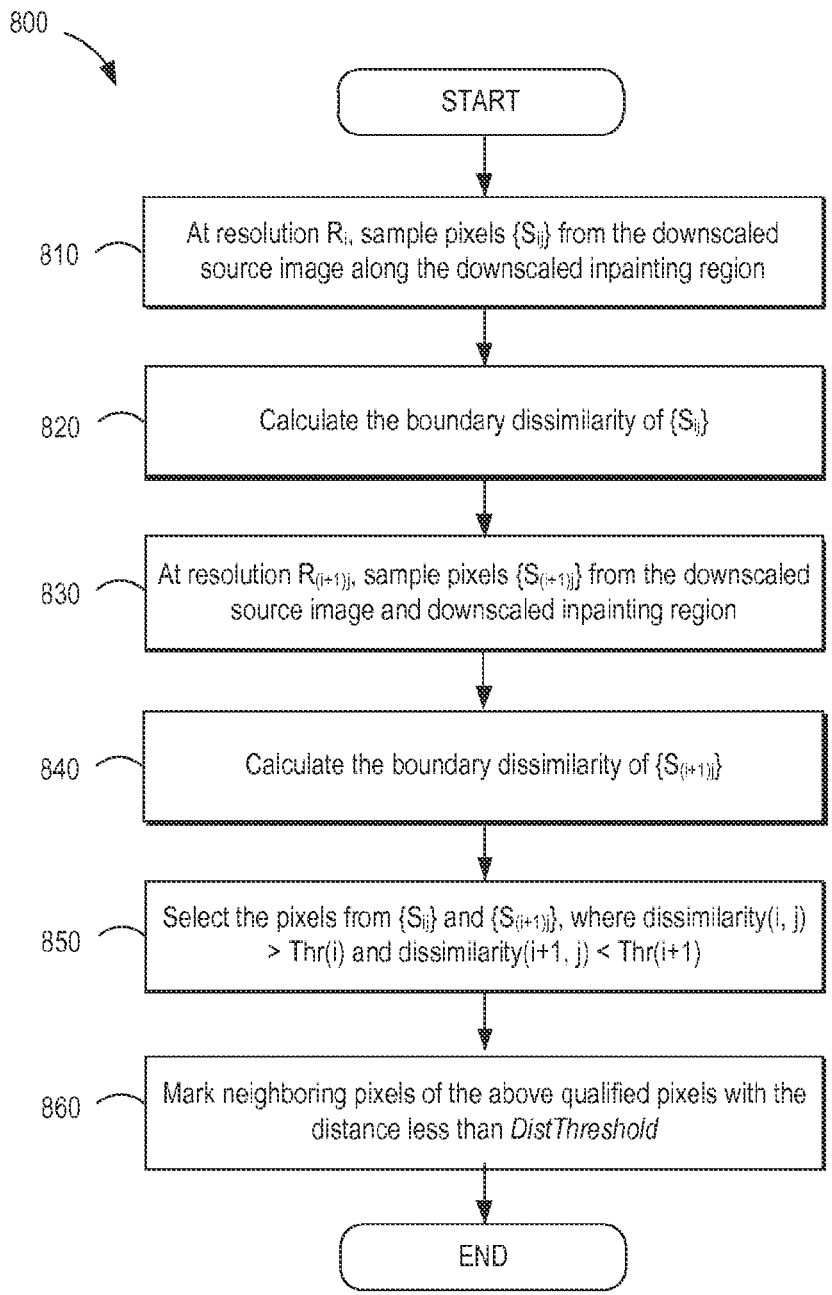
FIG. 8 is a top-level flowchart for identifying candidate pixels for inpainting purposes according to various embodiments of the present disclosure.

To further illustrate the operations discussed above in connection with block 740 above, reference is made to FIG. 8, which is a flowchart 800 in accordance with one embodiment for identifying candidate pixels for inpainting purposes. It is understood that the flowchart 800 of FIG. 8 provides merely an example of the many different types of functional arrangements that may be employed to implement the operation of the various components of the image editing system 102 (FIG. 5). As an alternative, the flowchart of FIG. 8 may be viewed as depicting an example of steps of a method implemented in the image editing system 102 according to one or more embodiments.

As discussed above in connection with block 740 in the flowchart of FIG. 7, pixels surrounding the inpainting region are sampled and candidate pixels for performing inpainting of the restoration region are identified based on a dissimilarity factor. Additional details for performing inpainting of the restoration region based on a dissimilarity factor are outlined in the flowchart of FIG. 8.

In block 810, at intermediate resolution $R_i$, pixels $\{S_{ij}\}$ from the downscaled source image are sampled along the downscaled inpainting region. This may comprise, for example, sampling pixels located a predetermined distance (e.g., 3 to 5 pixels) away from the boundary of the restoration region (i.e., pixels in a "dilated" boundary region).

In block 820, the boundary dissimilarity values of the pixels $\{S_{ij}\}$ are calculated. For some embodiments, the dissimilarity values are calculated as follows. An (n×n) pixel block (e.g., 16×16 block) centered about pixel $S_{ij}$ is identified. This represents a first boundary block at the intermediate resolution $R_i$. A plurality of (n×n) blocks centered about $\{T_{ij}\}$ is identified, where $\{T_{ij}\}$ represents sampled pixels located in the dilated boundary with dilating parameter 16. The geometry distance between Sij and Tij is less than a predetermined distance value (e.g., 32). The dissimilarity value is calculated by calculating the difference between corresponding color models of block ($S_{ij}$) and block ($T_{ij}$).

Figure 10A:
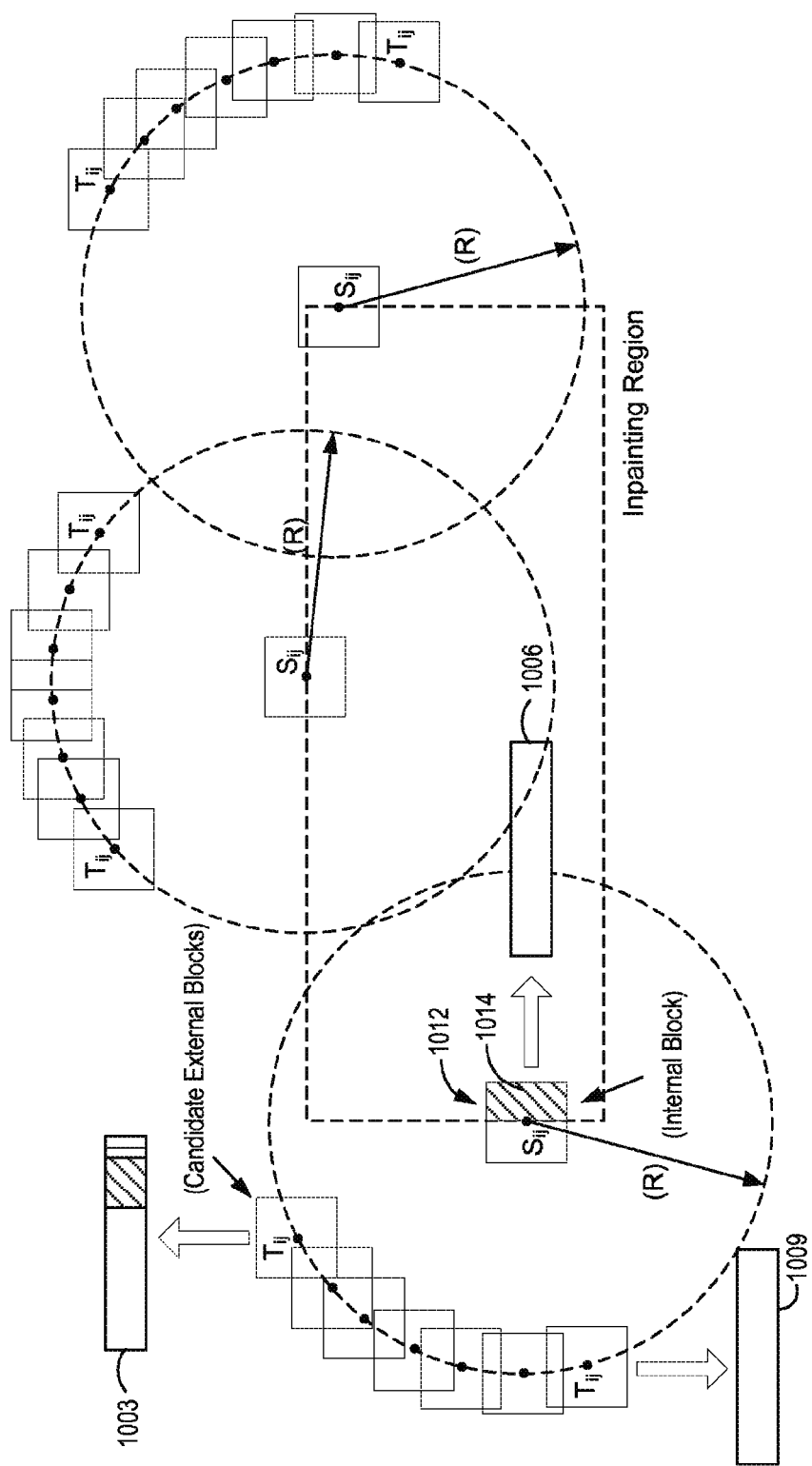
FIGS. 10A and 10B illustrate the comparison of color models associated with different pixel blocks for purposes of identifying one or more candidates for purposes of patch matching.

To further illustrate the use of dissimilarity values, reference is made to FIG. 10A, which illustrates the comparison of color models associated with different pixel blocks for purposes of identifying one or more candidates for purposes of patch matching later at the original resolution. As shown in FIG. 10A, a search is performed for candidate pixel block for purposes of patch matching. Patch matching involves identifying a suitable, matching pixel block by comparing the difference in color value of a pixel block 1012 centered about a boundary pixel, as shown in FIG. 10A. For purposes of this disclosure, the pixel block may also be referred to as a boundary block.

As described above in connection with block 820 in FIG. 8, the boundary dissimilarity values of the pixels $\{S_{ij}\}$ are calculated. For some embodiments, an (n×n) pixel block (e.g., 16×16 block) centered about pixel $\{S_{ij}\}$ is identified. A plurality of (n×n) blocks centered about $\{T_{ij}\}$ is identified, where $\{T_{ij}\}$ represents sampled pixels located in the dilated boundary with a dilating parameter and where the various (n×n) blocks constitute candidate blocks for purposes of patch matching, where the candidate blocks are adjacent to each other. For purposes of this disclosure, the pixel blocks centered about $\{T_{ij}\}$ may be referred to as external blocks, wherein the pixel block centered about $\{S_{ij}\}$ is referred to as an internal block.

As shown in FIG. 10A, the dilating parameter may correspond to a radius value (R) (e.g., 8 pixels) for a circle centered about pixel $\{S_{ij}\}$ located on the boundary where the pixels $\{T_{ij}\}$ are located on the circle. In this regard, neighboring pixels $\{T_{ij}\}$ relative to the boundary pixel $\{S_{ij}\}$ are analyzed. Note that while the illustration of FIG. 10A shows the various pixels $\{T_{ij}\}$ being spaced apart by more than one pixel, the pixels $\{T_{ij}\}$ may be spaced apart by any number of pixels, including a single pixel. For the pixel blocks corresponding to each $\{S_{ij}\}-\{T_{ij}\}$ pair, the associated color models are compared. That is, the color model of an internal block is compared to that of an external block.

In the example of FIG. 10A, the boundary pixel $\{S_{ij}\}$ has a corresponding color model 1006, which may be embodied, for example, as a histogram of the various colors within the block surrounding the boundary pixel $\{S_{ij}\}$. For a given boundary pixel $\{S_{ij}\}$, a comparison is made between the color model 1006 and the color models corresponding to the various $\{T_{ij}\}$ pixels. The $\{S_{ij}\}-\{T_{ij}\}$ pair with the closest matching color models is identified, and the color model of that particular $\{T_{ij}\}$ is used for patch matching purposes later at the original resolution.

In FIG. 10A, the color model 1009 of the pixel $\{T_{ij}\}$ near the bottom provides a better match with the color model 1006 of the boundary pixel $\{S_{ij}\}$ than the color model 1003 of the pixel $\{T_{ij}\}$ near the top of the circle (i.e., dilated boundary). Note that identification of an external block with the closest matching color model merely serves as a prediction that the corresponding pixel $\{T_{ij}\}$ will yield the best results when patch matching is later performed at the original resolution. That is, upon conversion back to the original resolution level, patch matching is performed based on the identified pixel $\{T_{ij}\}$. The process outlined above may be repeated for various boundary pixels $\{S_{ij}\}$ of the inpainting region.

Figure 10B:
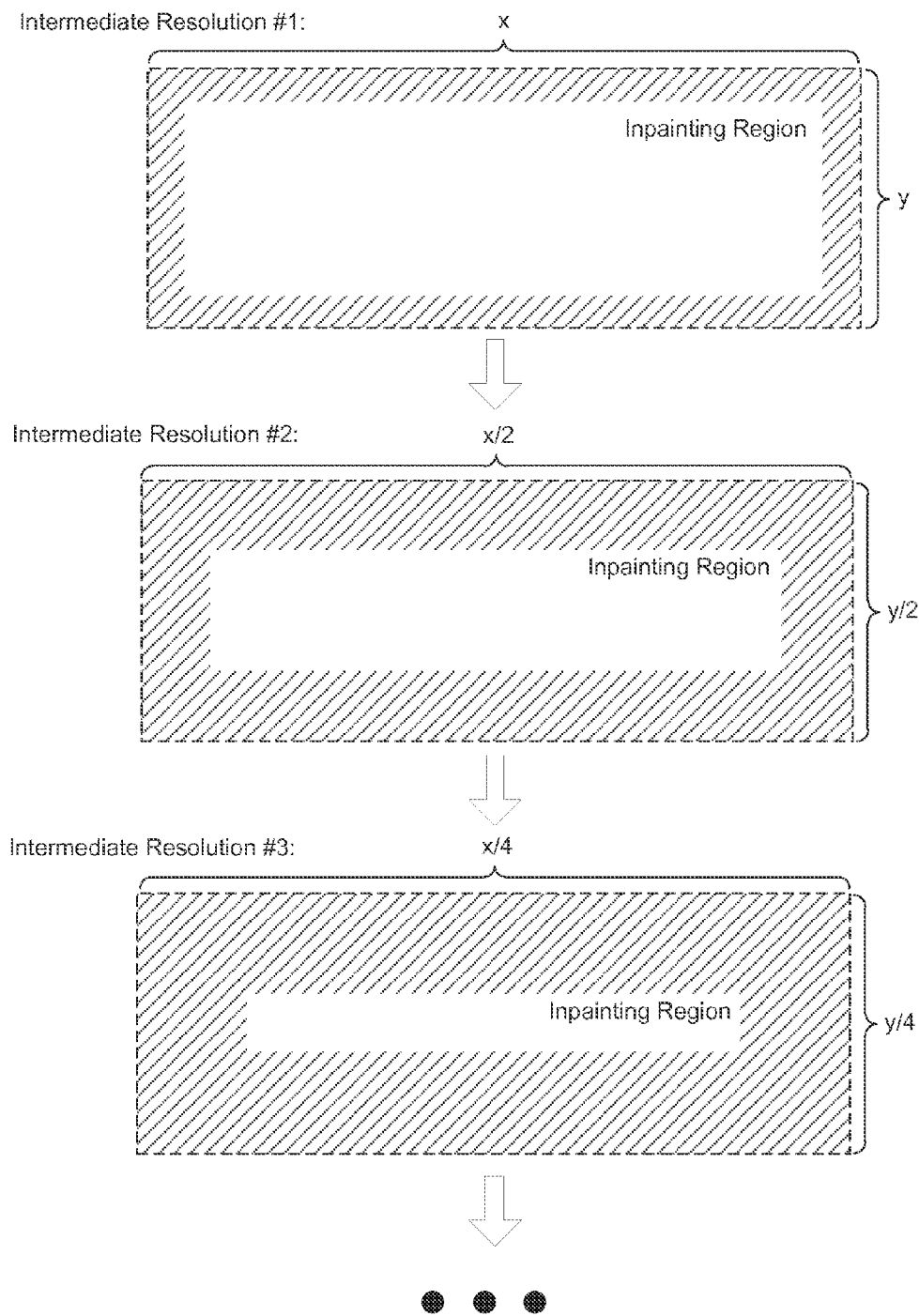

In accordance with some embodiments, a predetermined amount of inpainting is performed at each intermediate resolution, provided that a sufficient number of candidate pixels for patch matching purposes are available. In accordance with such embodiments, an amount equal to (n/2) pixels undergoes inpainting at each intermediate resolution. In particular, for each boundary pixel Sij, a region 1014 equal to a thickness of (n/2) located within the inpainting region undergoes inpainting. The result of partial inpainting is shown in FIG. 10B, where a cumulative effect occurs at each intermediate resolution level.

Referring back to FIG. 8, in block 830, at the next intermediate resolution $R_{(i+1)}$, pixels $\{S_{(i+1)j}\}$ from the downscaled source image and downscaled inpainting region are sampled. In block 840, the boundary dissimilarity value of pixels $\{S_{(i+1)j}\}$ is calculated. Pixels $\{S_{(i+1)j}\}$ represent a second boundary block at the next intermediate resolution $R_{(i+1)j'}$. Note that the secondary boundary block corresponds to the position of the first boundary block at the previous resolution ($R_i$).

In block 850, pixels from {$S_{ij}$} and {$S_{(i+1)j}$} are selected based on the following selection criteria: 1) pixels where dissimilarity(i, j)>Thr(i); and 2) pixels where dissimilarity(i+1,j)<Thr(i+1). In block 860, neighboring pixels of the above qualified pixels with the distance less than a predetermined distance threshold (e.g., DistThreshold) are marked.

Figure 11:
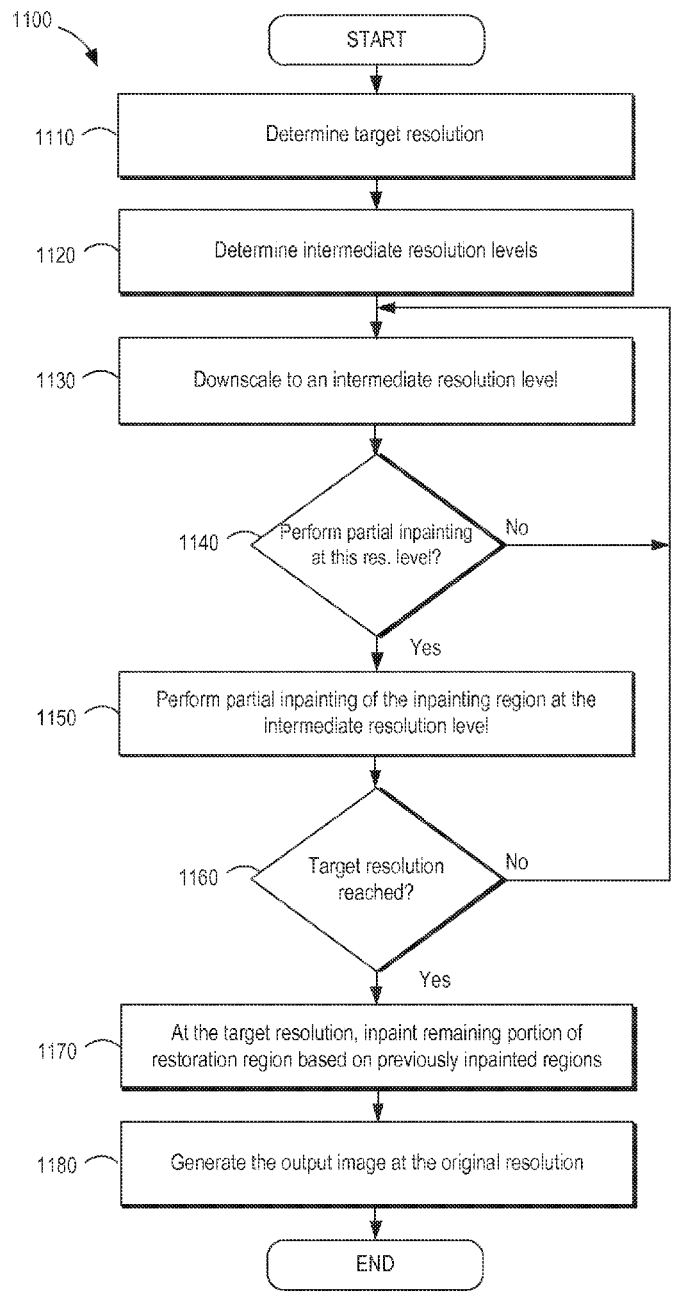
FIG. 11 is a top-level flowchart illustrating examples of functionality implemented as portions of the video editing system of FIG. 5 for facilitating inpainting according to an alternative embodiment of the present disclosure.

Reference is made to FIG. 11, which is a flowchart 1100 in accordance with an alternative embodiment for facilitating inpainting performed by the image editing system 102 of FIG. 5. It is understood that the flowchart 1100 of FIG. 11 provides merely an example of the many different types of functional arrangements that may be employed to implement the operation of the various components of the image editing system 102 (FIG. 5). As an alternative, the flowchart of FIG. 11 may be viewed as depicting an example of steps of a method implemented in the image editing system 102 according to one or more embodiments.

Although the flowchart of FIG. 11 shows a specific order of execution, it is understood that the order of execution may differ from that which is depicted. For example, the order of execution of two or more blocks may be scrambled relative to the order shown. Also, two or more blocks shown in succession in FIG. 11 may be executed concurrently or with partial concurrence. It is understood that all such variations are within the scope of the present disclosure.

Beginning with block 1110, a final, target resolution is determined where the target resolution is less than the original resolution of the source image.

In block 1120, intermediate resolution levels are calculated according to the following:

$$ri=1/2^i, i=1, 2, 3, \ldots \text{ (where } ri \text{ is greater than } rf\text{)}.$$

In block 1130, the image is downscaled from the original resolution level to the first intermediate resolution level as calculated above. In decision block 1140, a determination is made at the intermediate resolution level on whether to perform partial inpainting. For some embodiments, a determination may be made to bypass partial inpainting at the current intermediate resolution level. For some embodiments, the determination of whether to perform partial inpainting at the current intermediate resolution level is based on the dissimilarity between the internal block and the external block. If the dissimilarity between the blocks is greater than a threshold value, then a determination is made to perform partial inpainting at the current intermediate resolution level.

For some embodiments, determining whether to perform partial inpainting at the current intermediate resolution level is based on whether the dissimilarity value between the internal block and the external block is less than a threshold value for both the current intermediate resolution level and a next intermediate resolution level (i.e., a next lower resolution level). For some embodiments, this determination comprises selecting a pixel block located a predetermined distance from the boundary pixel block external to the inpainting region for patching matching for at least one pixel block on a boundary of the inpainting region. A first dissimilarity value relative to the boundary pixel block is determined at the current intermediate resolution level, and a second dissimilarity value relative to the boundary pixel block is determined at the next intermediate resolution level. If the first dissimilarity value and the second dissimilarity value are both less than a threshold value (i.e., good matches exist at both intermediate resolution levels), then inpainting at the current intermediate resolution level is bypassed and inpainting is performed at the next intermediate resolution level. To further illustrate, reference is made to the table below, which illustrates when inpainting is performed at a current intermediate resolution level.

| Current Intermediate Resolution Level | Next Intermediate Resolution Level | Inpaint at Current Intermediate Resolution Level? |
| --- | --- | --- |
| Good Match | Good Match | No |
| Good Match | Poor Match | Yes |
| Poor Match | Good Match | Yes |
| Poor Match | Poor Match | Yes |

In the table above, a "good match" corresponds to the dissimilarity value being below a threshold value, whereas a "poor match" corresponds to the dissimilarity value being greater than or equal to a threshold value.

If a determination is made to bypass partial inpainting at the current intermediate resolution, the process flows back to block 1130, where the image is downscaled to the next intermediate resolution. Referring back to decision block 1140, if a determination is made to perform partial inpainting at the current intermediate resolution, the process flows to block 1150, where partial inpainting is performed.

At decision block 1160, a determination is made on whether the current downscale resolution is equal to the final, target resolution. If the target resolution has not been reached, then operation returns back to block 1130, where downscaling is performed. If the target resolution has been reached, then in block 1170, the remaining portion(s) of the inpainting region is filled and a final image is generated with the inpainting region filled, as described above. In block 1180, an output image is generated at the original resolution.

Figure 12:
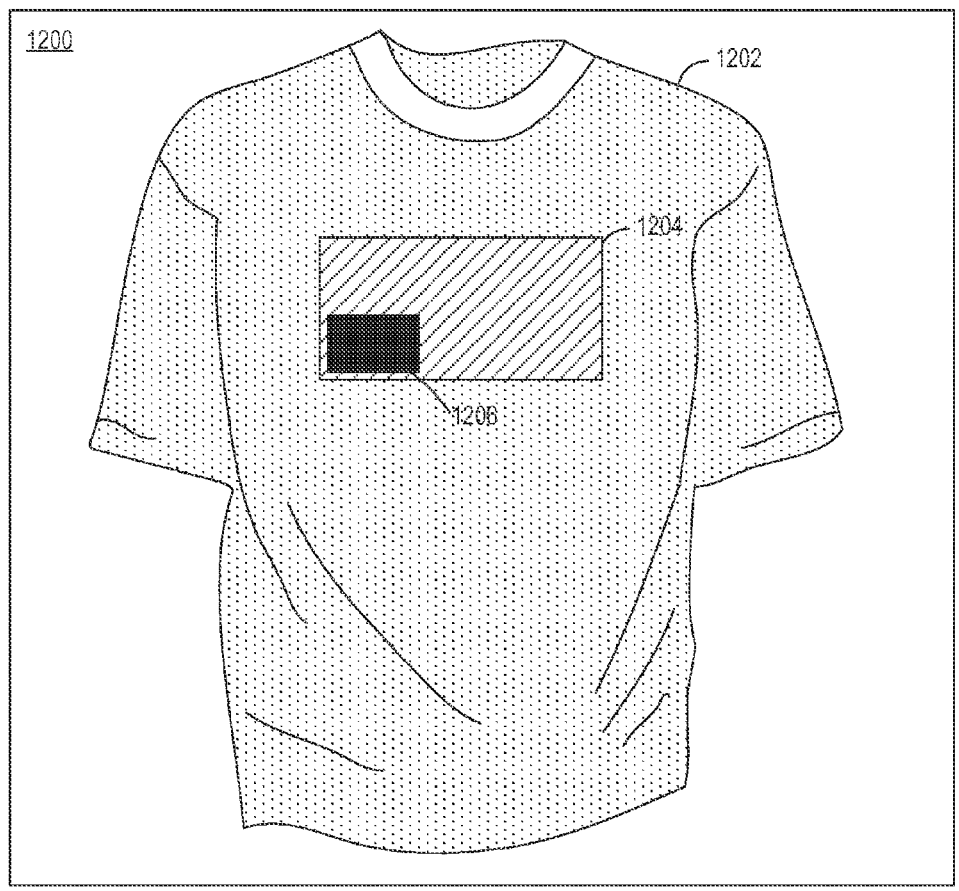
FIG. 12 is another example of an object within a digital image to be edited.

Reference is made to FIG. 12, which illustrates another example of a t-shirt object 1202 within an image 1200 to be edited. As with the example discussed above in connection with FIG. 1, the user wishes to remove an object (e.g., a "CL" letter object) from the t-shirt object 1202. In the example shown in FIG. 12, however, a source image is shown with a mask 1206 where the mask 1206 is offset to the left in region 1204 rather than being centrally located.

Figure 13:
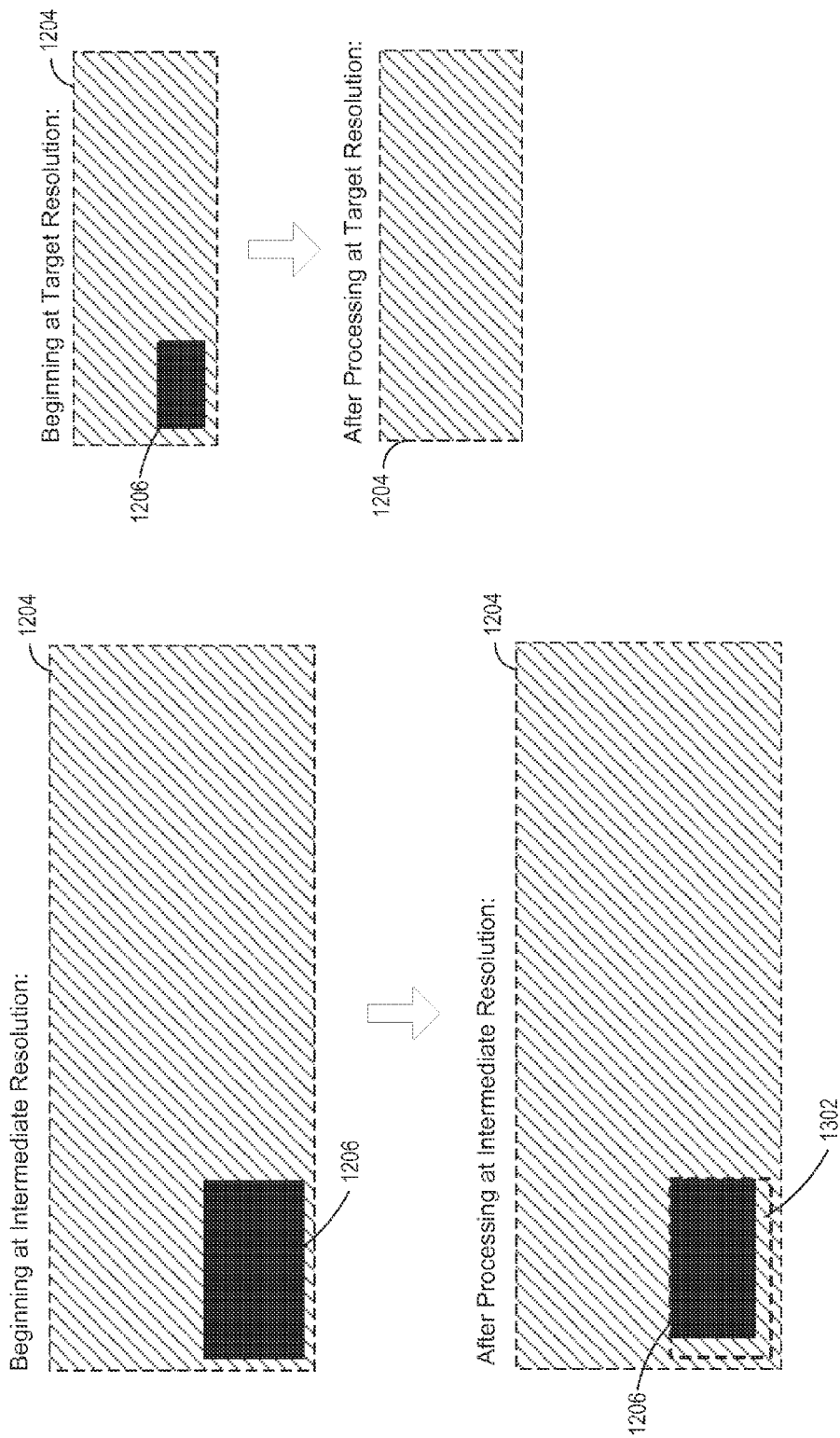
FIG. 13 illustrates the inpainting regions at intermediate resolutions.

With reference to the left side of FIG. 13, the mask 1206 is shown in region 1204 before and after inpainting at an intermediate resolution. As shown, mask 1206 undergoes partial inpainting, as illustrated by region 1302, which matches region 1204. After processing at the intermediate resolution, region 1302 matches region 1204. With reference to the right side of FIG. 13, mask 1206 undergoes further inpainting at the target resolution where the remainder of mask 1206 is inpainted to match region 1204. In this regard, applying the multi-tiered inpainting technique disclosed herein at intermediate resolutions results in a filled region that more closely matches the structure and texture of the area surrounding the inpainting region.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method for editing a digital image in an image editing device, comprising:
    obtaining an inpainting region in the digital image;
    determining a target resolution and at least one intermediate resolution for scaling a resolution of the digital image based on an original resolution of the digital image;
    scaling the resolution of the digital image to the intermediate resolution level;
    determining whether to perform partial inpainting of the inpainting region at the intermediate resolution level;
    based on the determination of whether to perform partial inpainting, performing partial inpainting at the intermediate resolution level; and
    at a final target resolution, performing inpainting on a remainder portion in the inpainting region,
    wherein the target resolution is determined according to the following expression:

$$rf = \min(32/d, 1),$$

wherein rf represents a downscale ratio, and wherein d represents a thickness of the inpainting region measured in pixels.

2. The method of claim 1, wherein the target resolution (Rf) is determined according to the following expression:

$$Rf = (\text{original resolution}) * (rf).$$

3. The method of claim 2, wherein the at least one intermediate resolution is determined based on the following expression:

$$ri = 1/2i, i = 1, 2, 3, \ldots$$

wherein ri represents an intermediate resolution ratio, and wherein the at least one intermediate resolution ratio (ri) is greater than the downscale ratio (rf).

4. The method of claim 3, wherein the at least one intermediate resolution (Ri) is calculated according to the following expression:

$$Ri = (\text{original resolution}) * (ri).$$

5. The method of claim 1, wherein scaling the resolution of the digital image to the intermediate resolution level comprises scaling a previously-scaled digital image at a prior intermediate resolution level.

6. The method of claim 1, wherein the target resolution is less than the original resolution.

7. The method of claim 1, wherein a number of intermediate resolution levels corresponds to a dimension of the inpainting region.

8. The method of claim 1, further comprising generating an output image at the original resolution based on the inpainting operation.

9. A method for editing a digital image in an image editing device, comprising:
    obtaining an inpainting region in the digital image;
    determining a target resolution and at least one intermediate resolution for scaling a resolution of the digital image based on an original resolution of the digital image;
    scaling the resolution of the digital image to the intermediate resolution level;
    determining whether to perform partial inpainting of the inpainting region at the intermediate resolution level;
    based on the determination of whether to perform partial inpainting, performing partial inpainting at the intermediate resolution level; and
    at a final target resolution, performing inpainting on a remainder portion in the inpainting region, wherein determining whether to perform partial inpainting of the inpainting region at the intermediate resolution level comprises:
    for at least a first boundary block of the inpainting region, selecting a block from adjacent blocks external to the inpainting region corresponding to the first boundary block;
    at the intermediate resolution level, calculating a first dissimilarity value relative to the first boundary block;
    at a next intermediate resolution level, calculating a second dissimilarity value relative to a second boundary block determined by the corresponding position of the first boundary block;
    in response to at least one of the first dissimilarity value and the second dissimilarity value being greater than a threshold value, performing partial inpainting on pixels surrounding a center of the boundary block.

10. The method of claim 9, wherein the pixels in the inpainting region surrounding the center of each of the boundary blocks comprise pixels within a predetermined distance to the center of the boundary block.

11. The method of claim 9, wherein selecting the block from the adjacent blocks external to the inpainting region comprises:
    sampling a predetermined number of pixels located a predetermined distance to the center of the boundary and external to the inpainting region;
    determining adjacent blocks centered around each of the sampled pixels;
    for each adjacent block, calculating each dissimilarity value relative to the boundary block; and
    determining the block with a minimum dissimilarity value as the selected block.

12. The method of claim 9, wherein each dissimilarity value is based on a difference between a color model of a block on the boundary of the inpainting region and a color model of one of the adjacent blocks external to the inpainting region.

13. The method of claim 9, wherein each dissimilarity value is based on a sum of absolute difference between a color model of the boundary block of the inpainting region and a color model of one of the adjacent blocks external to the inpainting region.

14. The method of claim 9, wherein each dissimilarity value is based on a sum of absolute pixel differences between the boundary block of the inpainting region and one of the adjacent blocks external to the inpainting region.

15. The method of claim 9, wherein each dissimilarity value is based on the sum of squared pixel differences between a boundary block of the inpainting region and one of the adjacent blocks external to the inpainting region.

16. A system for editing a digital image in an image editing device, comprising:
    a processor;
    a media interface, executable in the processor, configured to obtain an inpainting region in the digital image;
    a resolution adjuster, executable in the processor, configured to determine a target resolution and at least one intermediate resolution for scaling a resolution of the digital image based on an original resolution of the digital image;
    an inpainting component, executable in the processor, configured to determine whether to perform inpainting of the inpainting region and perform inpainting of the inpainting region based on the determination, wherein for an intermediate resolution level, the resolution adjuster is configured to scale the resolution of the digital image to the intermediate level and the inpainting component is configured to perform partial inpainting of the inpainting region at the intermediate resolution, and wherein the inpainting component is further configured to perform inpainting on a remainder portion in the inpainting region at the target resolution, wherein the target resolution is determined according to the following expression:

$$rf=\min(32/d, 1),$$

wherein rf represents a downscale ratio, and wherein d represents a thickness of the inpainting region measured in pixels.

17. The system of claim 16, wherein the resolution adjuster scales the resolution of the digital image to the intermediate level by scaling a previously-scaled digital image at a prior intermediate resolution level.

18. The system of claim 16, further comprising a region analyzer, executable in the processor, configured to determine dissimilarity values of pixels surrounding the inpainting region, wherein the inpainting component performs partial inpainting based on the dissimilarity values.

19. The system of claim 16, wherein the inpainting component performs partial inpainting by selecting, for at least one boundary block of the inpainting region, an adjacent block located a predetermined distance from the boundary pixel block external to the inpainting region, wherein the block is selected based on a dissimilarity value relative to the boundary block.

20. The system of claim 16, wherein a number of intermediate resolution levels corresponds to a thickness of the inpainting region.

21. The system of claim 16, wherein the resolution adjuster is further configured to upscale the digital image to the original resolution upon applying an inpainting operation to the remainder portion in the inpainting region at the target resolution.

22. A non-transitory computer-readable medium embodying a program executable in a computing device, comprising:

code that obtains an inpainting region in the digital image;

code that determines a target resolution and at least one intermediate resolution for scaling a resolution of the digital image based on an original resolution of the digital image;

code that scales, for an intermediate resolution level, the resolution of the digital image to the intermediate level;

code that determines whether to perform partial inpainting of the inpainting region at the intermediate resolution level;

code that performs partial inpainting at the intermediate resolution level based on the determination of whether to perform partial inpainting; and code that performs inpainting on a remainder portion in the inpainting region at the target resolution, wherein the target resolution is determined according to the following expression:

$$rf=\min(32/d, 1),$$

wherein rf represents a downscale ratio, and wherein d represents a thickness of the inpainting region measured in pixels.

23. The non-transitory computer-readable medium of claim 22, wherein the code that scales is configured to scale the resolution of the digital image to the intermediate level by scaling a previously-scaled digital image at a prior intermediate resolution level.

24. The non-transitory computer-readable medium of claim 22, further comprising code for determining dissimilarity values of pixels surrounding the inpainting region, wherein the partial inpainting is performed based on the dissimilarity values.

25. The non-transitory computer-readable medium of claim 22, further comprising code that selects for at least one boundary block of the inpainting region, a block located a predetermined distance from the boundary block external to the inpainting region for patching matching, wherein the block is selected based on a dissimilarity value relative to the boundary block.

26. The non-transitory computer-readable medium of claim 22, wherein the dissimilarity value is based on a sum of absolute difference between a color model of the at least one boundary block of the inpainting region and a color model of the adjacent block.

* * * * *